United States Patent
Lupinetti et al.

(10) Patent No.: US 6,830,738 B1
(45) Date of Patent: Dec. 14, 2004

(54) LOW-TEMPERATURE SYNTHESIS OF ACTINIDE TETRABORIDES BY SOLID-STATE METATHESIS REACTIONS

(75) Inventors: Anthony J. Lupinetti, Los Alamos, NM (US); Eduardo Garcia, Los Alamos, NM (US); Kent D. Abney, Los Alamos, NM (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 348 days.

(21) Appl. No.: 10/115,087

(22) Filed: Apr. 4, 2002

(51) Int. Cl.$^7$ .................. C01F 15/00; C01G 43/00; C01G 56/00

(52) U.S. Cl. ............ 423/249; 423/250; 423/251; 423/252; 423/254

(58) Field of Search .................. 423/249, 252, 423/254, 250, 251

(56) References Cited

FOREIGN PATENT DOCUMENTS

NL            6804216      * 9/1969

OTHER PUBLICATIONS

Lupinetti, Anthony J.; Fife, Julie; Garcia, Eduardo; Abney, Kent. D., "Preparation of Actinide Boride Materials Via Solid–State Metathesis Reactions and Actinide Dicarbollide Precursors,", AIP Conference Proceedings, 532 (Plutonium Futures—The Science), 127–129 (English) 2000, (no month).*

J. M. Haschke et al., "Reaction of Plutonium Dioxide with Water: Formation and Properties of $PuO_{2+x}$ ", Science 287, 285 (2000), (no month).

H. A. Eick et al., "Americium and Neptunium Borides", J. Inorg. Nucl. Chem. 31, 371 (1969), (no month).

J. J. Katz et al. *The Chemistry of Actinide Elements*, Chapman and Hall; New York, NY (1986), pp. 56, 280 and 317, (no month).

H. A. Eick, "Plutonium Borides", Inorg. Chem. 4, 1237 (1965), (no month).

R. E. Skavdahl et al., "Phase Relations in the Plutonium–Boron System", Trans. Am Nucl. Soc. 7, 403 (1964) (no month).

K. Su et al., "A Polymer Precursor Route to Metal Borides", Chem. Mater. 5, 1659 (1993), (no month).

L. Rao et al., "Rapid Synthesis of Transition–Metal Borides by Solid–State Metathesis", J. Mater. Res. 10, 353 (1995), (no month).

(List continued on next page.)

Primary Examiner—Wayne A. Langel
(74) Attorney, Agent, or Firm—Jim C. Durkis; Dickson Kehl; Paul A. Gottlieb

(57) ABSTRACT

The synthesis of actinide tetraborides including uranium tetraboride ($UB_4$), plutonium tetraboride ($PuB_4$) and thorium tetraboride ($ThB_4$) by a solid-state metathesis reaction are demonstrated. The present method significantly lowers the temperature required to $\leq 850°$ C. As an example, when $UCl_4$ is reacted with an excess of $MgB_2$, at 850° C., crystalline $UB_4$ is formed. Powder X-ray diffraction and ICP-AES data support the reduction of $UCl_3$ as the initial step in the reaction. The $UB_4$ product is purified by washing water and drying.

26 Claims, 2 Drawing Sheets

OTHER PUBLICATIONS

S. S. Kher et al., "Chemical Vapor Deposition of Metal Borides 7. The Relatively Low Temperature Formation of Crystalline Lanthanum Hexaboride Thin Films from Boron Hydride Cluster Compounds by Chemical Vapor Deposition", J. Phys. Chem. Solids 59, 1343 (1998), ( no month).

K. H. Wynne et al., "Ceramics Via Polymer Pyrolysis", Ann. Rev. Mater. Sci. 14, 297 (1984), (no month).

R. W. Rice, "Ceramics from Polymer Pyrolysis, Opportunities and Needs—A Materials Perspective", Am. Ceram. Soc. Bull. 62, 889 (1983), (no month).

E. G. Gillan et al., "Synthesis of Refractory Ceramics via Rapid Metathesis Reactions between Solid–State Precursors", Chem. Mater. 8, 333 (1996), (no month).

I. P. Parkin et al., "Metathetical Routes to Uranium and Thorium Oxides and Nitrides", J. Mat. Sci. Lett. 13, 1185 (1994), (no month).

J. C. Fitzmaurice et al., "Self Propogating Routes to Uranium and Thorium Pnictides and Chalcogenides", New J. Chem. 18, 825 (1994), (no month).

* cited by examiner

LOW-TEMPERATURE SYNTHESIS OF ACTINIDE TETRABORIDES BY SOLID-STATE METATHESIS REACTIONS

This invention was made with government support under Contract No. W7405-ENG-36 awarded by the U.S. Department of Energy to The Regents of The University of California. The government has certain rights in the invention.

FIELD OF THE INVENTION

The present invention relates generally to the preparation of actinide boride materials suitable for intermediate storage of actinide elements and, more particularly, to the use of low-temperature, solid-state metathesis reactions to prepare these materials.

BACKGROUND OF THE INVENTION

Department of Energy strategy for plutonium has shifted in focus within the past decade from production and recycling to stabilization and disposal. This change results from the reduction in the nuclear stockpile and the accompanying need for plutonium disposition. Today's strategy uses plutonium oxide as the optimum intermediate (i.e. $\leq$50-year) storage form, even though John M. Haschke et al. reported in "Reaction of Plutonium Dioxide with Water: Formation and Properties of $PuO_{2+x}$", Science 287, 285 (2000), that $PuO_2$ slowly reacts with moisture to form hydrogen, causing numerous safety and storage concerns.

The area of actinide borides is underdeveloped, in part due to the high temperatures required to produce these materials (See, e.g., H. A. Eick and R. N. R. Mulford, J. Inorg. Nucl. Chem. 31, 371 (1969). The list of known binary thorium- and uranium-boride phases includes only $ThB_4$, $ThB_6$, $ThB_{66}$, $UB_2$, $UB_4$, $UB_{12}$, with little information reported on their chemical properties (See, e.g., J. J. Katz et al. *The Chemistry of Actinide Elements*, Chapman and Hall; New York, N.Y. (1986), pages 56, 280 and 317 for Th, U and Pu, respectively). In contrast, plutonium borides have been synthesized at lower temperatures but require the use of molten plutonium (800° C.), which is extremely corrosive (See, e.g., H. A. Eick, Inorg. Chem. 4, 1237 (1965)), or the use of $PuH_3$ (900° C.) (See, e.g., R. E. Skavdahl et al., Trans. Am Nucl. Soc. 7, 403 (1964)). Plutonium borides are known to be refractory, but other properties such as chemical behavior and stability have not been evaluated. In contrast, many transition metal and lanthanide borides, such as $ZrB_2$ (See, e.g., K. Su and L. G. Sneddon, Chem. Mater. 5, 1659 (1993) and L. Rao et al., J. Mater. Res. 10, 353 (1995)), and $LaB_6$ (See, e.g., S. S. Kher and J. T. Spencer, J. Phys. Chem. Solids 59, 1343 (1998)), have been extensively studied and have been used as refractory materials and corrosion-resistant coatings. It is therefore expected that some actinide-boride phases will also be corrosion resistant.

During the past two decades significant advances have been made in the low-temperature synthesis of highly refractory materials (See, e.g., K. H. Wynne and R. W. Rice, Ann. Rev. Mater. Sci. 14, 297 (1984) and R. W. Rice, Am. Ceram. Soc. Bull. 62, 889 (1983)). New methods, such as molecular precursors, pre-ceramic polymers, chemical vapor deposition, sol-gel and hydrothermal syntheses, low-temperature molten salts, self-propagating high-temperature synthesis (SHS), and solid-state metathesis reactions (SSM), virtually eliminate the problems associated with slow solid-state diffusion by mixing the constituents of the ceramic at a molecular level. SHS and SSM methods have been used successfully to synthesize transition metal borides, nitrides, and oxides and actinide oxides and nitrides at low- to moderate-temperatures (See, e.g., E. G. Gillan and R. B. Kaner, Chem. Mater. 8, 333 (1996), I. P. Parkin and J. C. Fitzmaurice, J. Mat. Sci. Lett. 13, 1185 (1994), and I. P. Parkin and J. C. Fitzmaurice, New J. Chem. 18, 825 (1994)). The key to low-temperature synthesis is identification of suitable precursors that lead to ceramic materials having the desired physical characteristics described above. However, no mention is made of generating actinide borides using low-temperature SSM.

Accordingly, it is an object of the present invention to provide a low-temperature method for preparing stable actinide boride ceramic compositions from commonly available or readily prepared actinide compounds.

Additional objects, advantages and novel features of the invention will be set forth in part in the description which follows, and in part will become apparent to those skilled in the art upon examination of the following or may be learned by practice of the Invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method for preparing an actinide boride of an actinide element hereof includes the step of heating a mixture of a halide of the actinide element with a chosen amount of magnesium diboride such that a metathesis reaction occurs.

In another aspect of the present invention, in accordance with its objects and purposes, the method for preparing an actinide boride of an actinide element hereof includes the step of heating a mixture of an oxide of the actinide element with a chosen amount of magnesium diboride such that a metathesis reaction occurs.

In still another aspect of the present invention, in accordance with its objects and purposes, the method for preparing an actinide boride of an actinide element hereof includes the step of heating a mixture of an oxyhalide of the actinide element with a chosen amount of magnesium diboride such that a metathesis reaction occurs.

Benefits and advantages of the present invention include the conversion of already existing or readily generated actinide compounds into less-reactive, safer storage forms utilizing metathesis reactions which take place at readily attainable temperatures.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION

Figure 1:
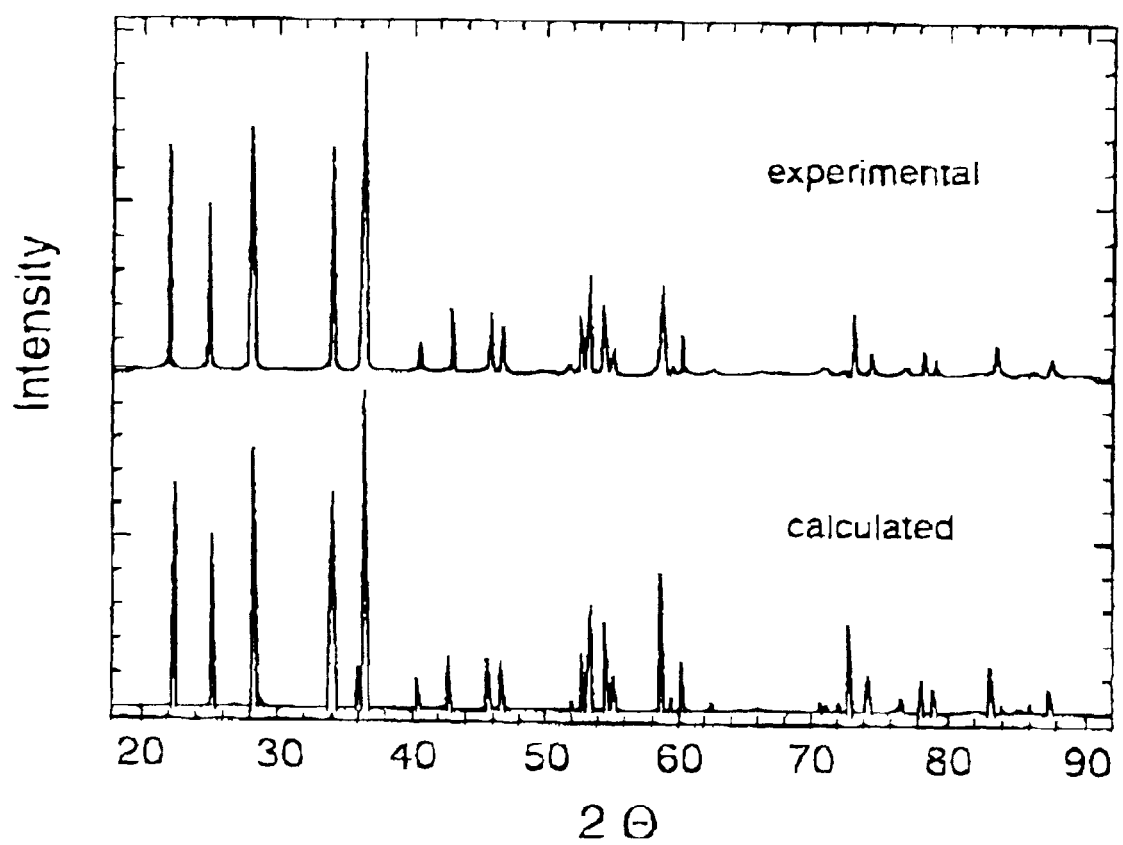
FIG. 1 shows the powder X-ray diffraction pattern for the water-washed solid product from the reaction of $UCl_4+2$ $MgB_2$ for 1 d at 850° C. (top), and a powder X-ray diffraction pattern of $UB_4$ calculated from single-crystal data (bottom).

Briefly, the present invention includes a method for the preparation of actinide borides by low-temperature, solid-state metathesis reactions as an alternative intermediate storage form for actinide elements. These materials are highly-refractory boride phases of plutonium and other actinides that are stable to moisture, are highly compact, and have many of the desired nonproliferation physical characteristics such as chemical inertness and stability to radiolytic decay. The basic reaction involves a source of boron, such as magnesium diboride with a halide, oxide or oxyhalide of the actinide.

Chlorides, bromides and iodides are all suitable halides since the respective heats of reaction readily drive the reactions to completions. Actinide halides include trichlorides and tetrachlorides, oxides include dioxides and oxyhalides include oxychlorides. Although the method of the present invention has been demonstrated for chlorides of several actinide elements and oxides thereof, it is anticipated that the above-described metathesis reactions will proceed well with bromides and iodides and actinide oxyhalides having chlorine, bromine, and iodine; as examples, $UOCl_2$ and $ThOCl_2$ and $PuOCl$ can be used.

For actinide halides and oxyhalides, a fluxing agent such as potassium chloride, lithium chloride or calcium chloride, or eutectic mixtures of these salts is optional and assists in the intimate mixing of the reacting species at low temperatures by dissolving the actinide compound without taking part in the reaction. This results in shorter reaction times. As an example, a eutectic mixture of potassium and lithium chlorides melts at 352° C., and allows the metathesis reactions to take place at this low temperature. Sodium and cesium chlorides could also be used; the choice of fluxing agent relates to its low melting point and lack of reactivity with the species of interest. As an example, since $UCl_4$ has a low melting temperature, a fluxing agent would not be required. For the actinide oxides, a fluxing agent is mandatory since these materials have high melting temperatures and slow reaction times. Upper limits for the reaction temperature are limited by materials compatibility, expense and convenience; 850° C. has been found to be a preferred upper temperature limit, although higher reaction temperatures can be utilized.

Quartz and titanium reaction vessels have been successfully used. It is anticipated that tungsten would also be suitable.

When mixtures of borides are formed in the metathesis reaction, as in the case when uranium and plutonium trichlorides are converted, the addition of elemental boron permits the reaction to proceed to essential completion with the generation of substantially only the actinide tetraboride.

In accordance with the teachings of the present invention, suitable actinides include plutonium, uranium, thorium, americium, and neptunium.

Having generally described the invention, the following EXAMPLES provide additional details.

EXAMPLE 1

Preparation of $UB_4$ from $UCl_4$ and $MgB_2$:

Typically, 50–250 mg of $UCl_4$ and 2 equivalents of $MgB_2$ were reacted in a vacuum-sealed 1.5 mL quartz tube by heating the mixture to 850° C. for 1 d (Although depleted uranium ($^{238}U$) was used, care must be taken in the handling and disposal of the starting materials and products since they are alpha particle emitters.). Sealed ampoules were run in furnaces in a fume hood to prevent contamination in the case of a tube rupture:

$UCl_4 + 2MgB_2 \rightarrow UB_4 + 2MgCl_2 (\Delta H_{rxn} = -58 \text{ kcal/mole})$ After the reaction, the tubes were opened and the contents washed with water to remove soluble salts. The sample was then rinsed with ethanol and dried. The bromide of uranium may also be employed in place of the chloride.

Reference will now be made in detail to the present preferred embodiments of the present invention, examples of which are shown in the accompanying drawings. Turning now to FIG. 1, a powder X-ray diffraction (pXRD) pattern of the washed product is compared with a $UB_4$ pattern calculated from single-crystal data. From the similarity of the experimental pattern and the calculated pattern it is clear that $UB_4$ is the only crystalline phase readily identified in the remaining solid.

Figure 2:
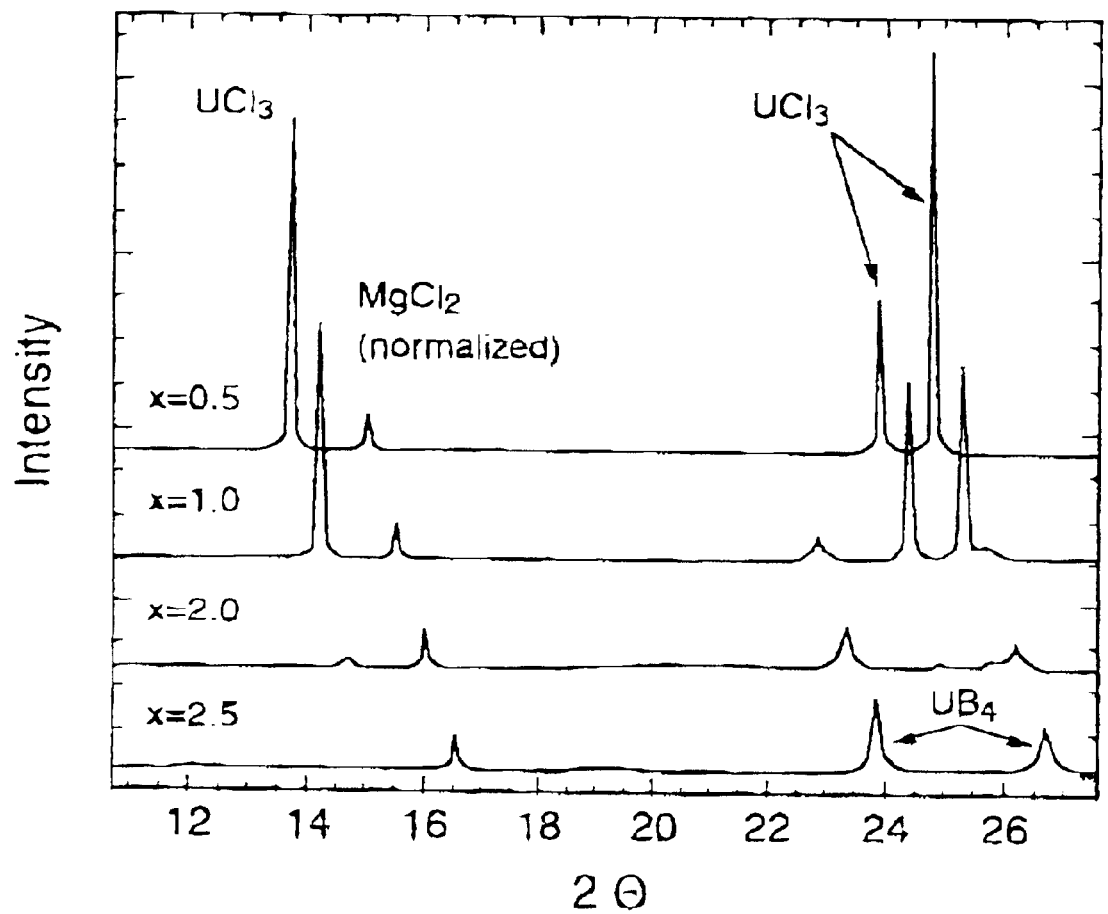
FIG. 2 shows X-ray powder diffraction patterns of the crude products of the reaction of $UCl_4$ with: (a) 0.5 $MgB_2$; (b) 1 $MgB_2$; (c) 2 $MgB_2$; and (d) 2.5 $MgB_2$, at 850° C. for 1 d. The powder patterns-are normalized to a constant $MgCl_2$ peak height. The x-axis corresponds to pattern (a), while patterns b–d are offset by +0.5 degrees in 2 Θ from pattern (a) for clarity. All powder patterns were taken with the sample under a dry, inert atmosphere.

The reaction of $UCl_4$ with substoichiometric amounts of $MgB_2$ produces a mixture of crystalline phases composed of $UB_4$, $UCl_3$, and $MgCl_2$. X-ray powder diffraction patterns of the reactions of $UCl_4 + xMgB_2$, where x=0.5, 1, 2, and 2.5 for reactions conducted at 850° C. for 1 d are shown in FIG. 2 hereof. As the amount of $MgB_2$ in the reaction is increased, the amount of $UCl_3$ remaining in the reaction decreases while the amount of $UB_4$ produced increases. The presence of $UCl_3$ in the reaction mixture was also confirmed by single-crystal X-ray diffraction. This evidence suggests that $MgB_2$ acts as a reducing agent as well as a source of boron: $UCl_4 + 0.5 \, MgB_2 \rightarrow UCl_3 + 0.5 \, MgCl_2 + B$.

To support this hypothetical reduction of $UCl_4$ to $UCl_3$ and in order to better understand the nature of the reaction products, two sets of samples were taken for ICP-AES analysis. First, the reaction products were washed with 40 mL of distilled water and the filtrate collected. Separately, the water-insoluble, solid products were dissolved in 20 mL of 3.2 M $HNO_3$. Any unreacted $UCl_4$, as well as $UCl_3$ and $MgCl_2$ produced, will dissolve in the water; unreacted $MgB_2$ and $UB_4$ produced are insoluble in water and will remain in the solid. The resulting samples were analyzed for uranium, magnesium and boron content and compared with the initial amounts present in the reaction. At 0.5 equivalents (eq) of $MgB_2$, almost all of the uranium (96%) and magnesium (83%) are present in the filtrate, which is consistent with the production of soluble $UCl_3$ and $MgCl_2$ as proposed above. This is also consistent with the lack of $UB_4$ and $MgB_2$ in the pXRD pattern of this sample (See, FIG. 2a). The lack of significant amounts of magnesium (1%) in the x=0.5 solid is consistent with formation of elemental boron as the only boron-containing production in the reduction reaction proposed above (i.e., no $MgB_2$ remains and no $UB_4$ has yet been formed).

With increasing amounts of $MgB_2$ (i.e., $x \geq 0.5$), the amount of uranium in the filtrate is expected to decrease and the amount in the solid increase due to the conversion of soluble $UCl_3$ into insoluble $UB_4$. At x=2.5, 90% of the uranium was found to be in the solid product. If all of the uranium in the solid samples is in the form of $UB_4$, the elemental boron in x=0.5 must be converted to $UB_4$ as x approaches 2.5 (See FIG. 2d). For all values of x, less than 4% of the magnesium is in the solid product; thus, all of the magnesium is dissolved in the filtrate (presumably as $MgCl_2$). This is consistent with the observation that no magnesium uranium boride ternary phases are present in pXRD patterns.

Experiments were also conducted to determine the effect of time (1–5 d) and temperature (600–850° C.) on the reaction of $UCl_4$ with 2 eq of $MgB_2$, $UCl_3$, and $MgCl_2$. The major difference in these reactions is the crystallinity of the $UB_4$; as might be expected, longer reaction times and higher temperatures yield a more crystalline product.

Thus $UCl_4$ has been demonstrated to be converted in high yield (90+% by ICP-AES based on total uranium) to the refractory boride $UB_4$ by solid-state metathesis methods. No other uranium boride compounds were observed in these studies. These methods allow for the formation of crystalline boride materials at low temperatures (i.e., between 600 and 850° C.) using quartz reaction vessels.

EXAMPLE 2

Preparation of $ThB_4$ from $ThCl_4$:

To 0.200 g of $ThCl_4$ (0.535 mmol), 0.0123–0.1474 g of $MgB_2$ (0.268–3.210 mmol; 0.5–6 equivalents (eq)) were added, and the mixture placed In a tantalum reaction vessel that was sealed under 1 atm of He. The reaction was heated to 850° C. over and held at that temperature for 5 d. After cooling, the reaction tubes were opened in an inert-atmosphere, dry glovebox. Powder X-ray diffraction samples were prepared, and the samples analyzed. It was found that both $ThB_4$ and $ThB_6$ form in the reactions.

EXAMPLE 3

Preparation of $UB_4$ from $UCl_3$:

0.200 g of $UCl_3$ (0.581 mmol) were combined with 0.040 g of $MgB_2$ (0.871 mmol; 1.5 eq) or with 0.040 g of $MgB_2$ (0.871 mmol; 1.5 eq) and 0.0753 g of B (6.969 mmol; 12 eq) in a tantalum reaction vessel that was sealed under 1 atm of He. The reaction was heated to 850° C. over and held at that temperature for between 1 h and 30 d. After cooling, the reaction tubes were opened in an inert-atmosphere, dry glovebox. Powder X-ray diffraction samples were prepared, and the samples analyzed. It was found that both a 50% mixture of $UB_2$ and $UB_4$ formed in the first case and only $UB_4$ when boron was added to the reactions. Thus, the addition of elemental boron permits the reaction to proceed to completion.

EXAMPLE 4

Preparation of $UB_4$ from $UO_2$:

0.200 g of $UO_2$ (0.741 mmol), 0.0680 g of $MgB_2$ (1.481 mmol; 2 eq) and 0.55 g of KCl (0.74 mmol; 10 eq) as a flux material were placed into a tantalum reaction vessel that was sealed under 1 atm of He. The reaction was heated to 850° C. and held at that temperature for 5 d. After cooling, the reaction tube was opened in an inert-atmosphere, dry glovebox. A powder X-ray diffraction sample was prepared and the sample analyzed. It was found that $UB_4$ was the only uranium boride present in the reaction products. The use of LiCl and $CaCl_2$, NaCl and CsCl, and eutectic mixtures thereof, as flux materials are expected to yield similar results. The use of low-melting fluxing agents should permit the metathesis reactions to occur at as low as about 350° C.; for example, a 44% eutectic mixture of LiCl in KCl melts at 352° C.

EXAMPLE 5

Preparation of $PuB_4$ from $PuCl_3$:

5.0 g of $PuCl_3$ (14.5 mmol) are combined with up to 3.0 g of $MgB_2$ (65.2 mmol; 4.5 eq) in an open tantalum cylinder. The reaction was heated to 850° C. under a dry Ar atmosphere and held at that temperature for 1 d. After cooling, a powder X-ray diffraction sample was prepared and the sample analyzed. Powder X-ray diffraction revealed that $PuB_2$ and $PuB_4$ were present in the reaction products.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for preparing an actinide boride of an actinide element which comprises the steps of heating a mixture of an oxide of said actinide element with an amount of magnesium diboride such that a metathesis reaction occurs, thereby forming said actinide boride.

2. The method of claim 1, wherein the oxide of said actinide element comprises the dioxide thereof.

3. The method of Claim 1, wherein said actinide element is selected from the group consisting of uranium, plutonium, americium, neptunium, and thorium.

4. The method of claim 2, wherein said actinide element comprises uranium and wherein said actinide boride comprises $UB_4$.

5. The method of claim 1, wherein a low-melting flux is added to said mixture.

6. The method of claim 5, wherein said low-melting flux is selected from the group consisting of potassium chloride, lithium chloride, calcium chloride, sodium chloride, and cesium chloride, and mixtures thereof.

7. The method of claim 2, wherein the amount of magnesium diboride comprises $\geq 0.5$ molar equivalents of magnesium diboride.

8. The method of claim 7, wherein the amount of magnesium diboride comprises 2.5 molar equivalents of magnesium diboride.

9. The method of claim 1, wherein the mixture is heated to $\leq 850°$ C.

10. The method of claim 9, wherein the mixture is heated to between 350° C. and 850° C.

11. The method of claim 2, wherein the mixture of the dioxide of said actinide element with an amount of magnesium diboride is heated under helium.

12. The method of claim 1, further comprising the steps of washing said actinide boride with water.

13. The method of claim 12, further comprising the step of drying said actinide boride.

14. The method of claim 2, wherein the step of heating a mixture of the dioxide of said actinide element with an amount of magnesium diboride is performed in a vessel selected from the group consisting of quartz, tantalum and tungsten.

15. A method for preparing an actinide boride of an actinide element which comprises the step of heating a mixture of an oxyhalide of said actinide element with an amount of magnesium diboride such that a metathesis reaction occurs, thereby forming said actinide boride.

16. The method of claim 15, wherein the halide of said oxyhalide of said actinide element is selected from the group consisting of chlorine, bromine and iodine.

17. The method of claim 15, wherein said actinide element is selected from the group consisting of uranium, plutonium, americium, neptunium and thorium.

18. The method of claim 17, wherein said oxyhalide is selected from the group consisting of $UOCl_2$, $ThOCl_2$, and PuOCl.

19. The method of claim 15, wherein a low-melting flux is added to dissolve said actinide oxyhalide.

20. The method of claim 19, wherein said low-melting flux is selected from the group consisting of potassium chloride, lithium chloride, calcium chloride, sodium chloride, and cesium chloride, and mixtures thereof.

21. The method of claim 15 wherein the mixture is heated to $\leq 850°$ C.

22. The method of claim 21, wherein the mixture is heated to between 350° C. and 850° C.

23. The method of claim 15, wherein the mixture of the oxyhalide of said actinide element with an amount of magnesium diboride is heated under helium.

24. The method of claim 15, further comprising the steps of washing said actinide boride with water.

25. The method of claim 24, further comprising the step of drying said actinide boride.

26. The method of claim 15, wherein the step of heating a mixture of the oxyhalide of said actinide element with an amount of magnesium diboride is performed in a vessel selected from the group consisting of quartz, tantalum and tungsten.

* * * * *